Jan. 7, 1969

R. S. ENGELBRECHT 3,421,118

ADJUSTABLE PHASE EQUALIZER

Filed July 1, 1965

INVENTOR
R. S. ENGELBRECHT
BY
ATTORNEY

AVERAGE PHASE VARIATIONS

SLOPE VARIATIONS

3π RIPPLE (COSINE)

3π RIPPLE (SINE)

2π RIPPLE (COSINE)

2π RIPPLE (SINE)

π RIPPLE (COSINE)

π RIPPLE (SINE)

PREAMPLIFIER PHASE CHARACTERISTIC

COMPENSATED PHASE CHARACTERISTIC

United States Patent Office 3,421,118
Patented Jan. 7, 1969

3,421,118
ADJUSTABLE PHASE EQUALIZER
Rudolf S. Engelbrecht, Bernardsville, N.J., assignor to Bell Telephone Laboratories, Incorporated, New York, N.Y., a corporation of New York
Filed July 1, 1965, Ser. No. 468,742
U.S. Cl. 333—28                       7 Claims
Int. Cl. H03h 5/02

ABSTRACT OF THE DISCLOSURE

This application describes a phase equalizer capable of generating any arbitrary frequency-phase characteristic. In accordance with one embodiment of the invention, the input signal is divided into two equal components by means of a 3 db quadrature coupler. Each of the two signal components is then coupled to one of two identical reactive networks. The latter are essentially delay lines with adjustable discontinuities longitudinally disposed therealong. The reflected signal components are recombined in the coupler. The phase characteristic of the device is varied by adjusting the magnitude of the discontinuities. In a second embodiment, a three port circulator and a single network are used.

---

This invention relates to electromagnetic wave transmission systems and more specifically to phase equalizers for use in such systems.

The phase shift between the input and output of a high frequency transmission system is related to the time required for wave energy to propagate through the system. It is well known, however, that in most high frequency transmission systems, waves of different frequencies propagate at different velocities. Accordingly, some frequency components are delayed longer than others, and as a consequence, phase (or time-delay) distortion results. Transmission of electromagnetic wave energy without phase distortion is desirable in many systems, and is imperative in systems where waveshapes must be accurately maintained during transmission.

In a microwave system having a plurality of physically separate transmission channels, all operating over the same band of frequencies, it may also be necessary to provide "phase tracking" among the various channels. As used herein, the term "phase tracking" merely means that the phase-versus-frequency characteristics of all the channels of a multichannel transmission system are substantially identical over a given band of frequencies. In order to achieve phase tracking, there need be included an equalization network capable of adjusting the average phase shift, the slope of the phase characteristic and the phase ripple components of each transmission channel.

It is, accordingly, the broad object of the invention to selectively delay high frequency wave energy over a range of operating frequencies in a simple manner in order to control the frequency-phase characteristic of a transmission system.

In accordance with one embodiment of the present invention, the frequency-phase characteristic of a transmission system is controlled by means of a phase equalizer comprising two substantially identical reactive networks connected, respectively, to the different branches of one pair of conjugate branches of a 90 degree hybrid junction. The other pair of conjugate branches constitute the input and output branches of the equalizer.

The reactive networks used are essentially reactively terminated delay lines of adjustable electrical length, having adjustable discontinuities positioned along their lengths. The degree and distribution of the phase correction introduced by the phase equalizer is controlled by varying the overall delay of the networks and by varying the magnitudes of the discontinuities.

In a second embodiment of the invention, a circulator is used with only one reactive network. The network, as in the first embodiment, is reactively terminated and includes a plurality of adjustable discontinuities along its length.

It is characteristic of the invention that, within broad limits, phase equalization of an arbitrary phase characteristic can be obtained. This is in marked contrast to most prior art microwave phase equalizers which typically are capable of only correcting phase distortion of a prescribed and limited type.

These and other objects and advantages, the nature of the present invention, and its various features, will appear more fully upon consideration of the various illustrative embodiments now to be described in detail in connection with the accompanying drawings, in which.

Figure 1:
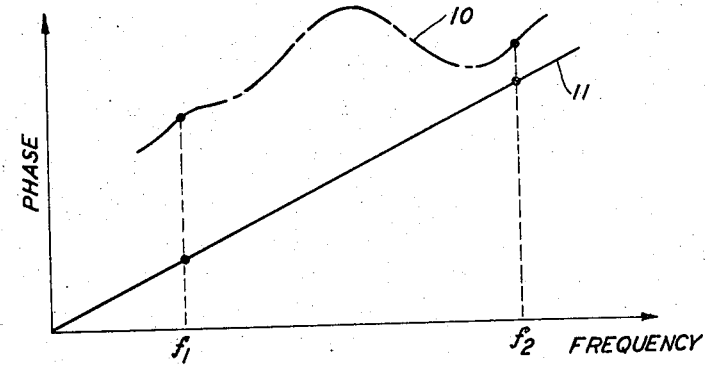
FIG. 1 shows an arbitrarily general frequency-phase characteristic.

Referring more specifically to the drawings, curve 10 of FIG. 1 represents an arbitrarily general frequency-phase characteristic. Curve 10 can be the phase transmission characteristic of a transmission system comprising a long distance transmission line; an amplifier, or other circuit component; or combinations of transmission line and circuit components. Curve 11, by way of contrast, represents the linear frequency-phase characteristic (i.e., constant delay) of a distortion-free transmission system. The dashed lines, indicating an upper frequency $f_2$ and a lower frequency $f_1$, denote the frequency band over which the system is to be equalized.

Figure 2:
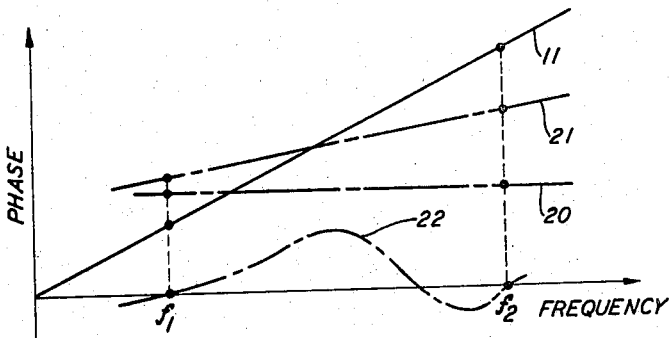
FIG. 2 shows the average phase, the phase-slope and the phase-ripple components of the frequency-phase characteristic of FIG. 1.

The curves 20, 21 and 22 in FIG. 2, are a representation of the component parts of curve 10. Curve 11 is also shown for the purpose of comparison. Referring to FIG. 2, curve 20 represents the average phase component of the phase characteristic represented by curve 10. Curve 21 represents the phase-slope component, and curve 22 represents the phase-ripple component of this phase characteristic. It is seen that by combining curves 20, 21 and 22 algebraically, the overall phase characteristic represented by curve 10 of FIG. 1 is obtained. Again the upper and lower frequencies of the frequency band of interest are designated by $f_2$ and $f_1$, respectively.

Figure 3A:
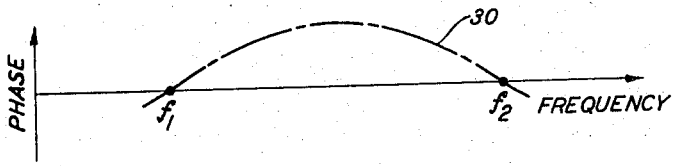
FIGS. 3A, 3B and 3C are graphical representations of the first, second and third order Fourier components of the phase-ripple curve of FIG. 2.
Figure 3B:
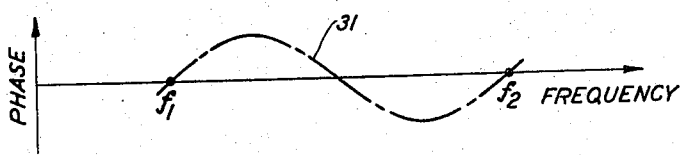
Figure 3C:
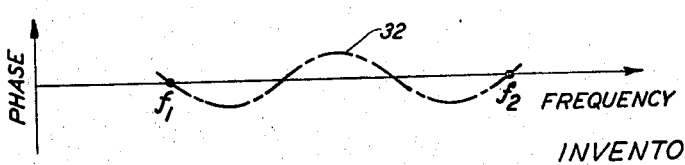

FIGS. 3A, 3B and 3C are graphical representations of the first, second, and third order Fourier components of the phase-ripple curve 22 of FIG. 2. As can be seen, the frequency scales of FIGS. 3A, 3B and 3C are the same as those of FIGS. 1 and 2. However, for the sake of clarity the vertical, or phase scales, of FIGS. 3A, 3B and 3C have been slightly expanded for purposes of illustration.

Referring more specifically to these figures, curve 30 of FIG. 3A is a sinusoidal curve extending between frequencies $f_1$ and $f_2$. The "period" of this curve is $$1/2(f_2 - f_1)$$

or $1/2(\Delta f)$, where $\Delta f = (f_2 - f_1)$. Curve 31 of FIG. 3B is also a sinusoidal curve but has a period $1/\Delta f$, and curve 32 of FIG. 3C is a negative sine curve having a period of $1/\tfrac{2}{3}(\Delta f)$. When curves 30, 31 and 32 are algebraically combined the resulting waveform produced is the phase-ripple curve 22 of FIG. 2.

It is understood that, in general, the phase-ripple component curve of a transmission system may have Fourier components higher than the third order. In addition, it is obvious that the null points of the Fourier components will not necessarily correspond to the upper and lower frequencies of the band. However, for the sake of illustration, phase-ripple curve 22, and its Fourier component curves 30, 31 and 32, have been so limited. The more general case where these limits do not obtain will be discussed in greater detail hereinafter.

One function of a phase equalizer, in accordance with the instant invention, is to compensate the overall phase characteristic, represented by curve 10 of FIG. 1, so that a linear phase characteristic, shown by curve 11 of FIG. 1, is more nearly obtained.

A second function of a phase equalizer is to match the phase characteristics of two transmission systems, neither of which is linear.

Figure 4:
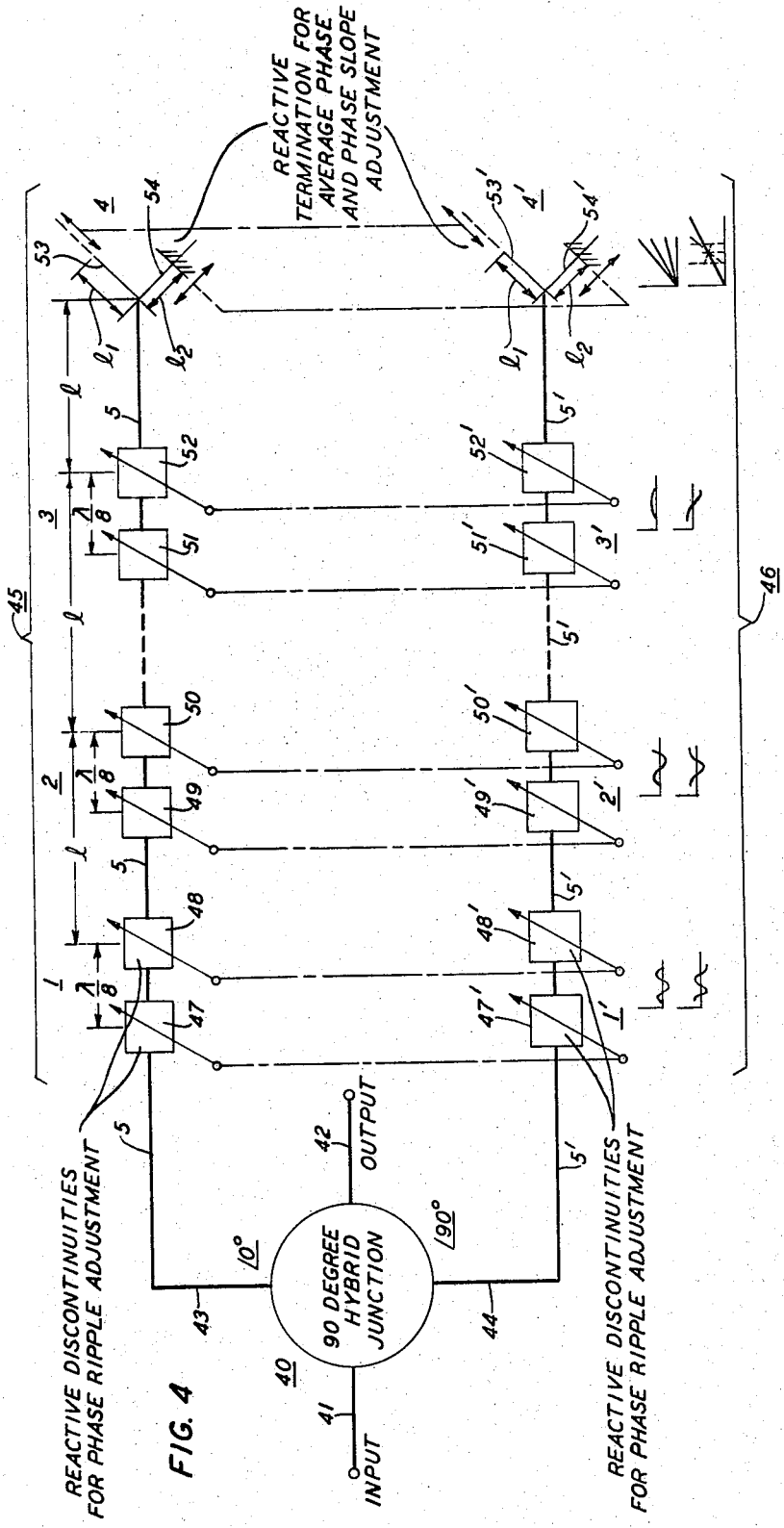
FIG. 4 is a block diagram of a first illustrative embodiment of a phase equalizer in accordance with the invention using a quadrature hybrid junction and two reactive networks.

The steps and apparatus to achieve either of these equalization results can be readily explained in terms of, and by reference to, the individual component curves 20, 21 and 22 of FIG. 2 and curves 30, 31 and 32 of FIGS. 3A, 3B and 3C, respectively, by referring to the illustrative embodiment of the invention illustrated in block diagram in FIG. 4.

The illustrative embodiment of the invention shown in FIG. 4 comprises a 3 db quadrature hybrid junction 40 and a pair of substantially identical reactive networks 45 and 46. Each of the networks is connected to a different branch of one pair of conjugate branches 43 and 44, respectively, of hybrid junction 40. The other pair of conjugate branches of junction 40 are the input branch 41 and the output branch 42.

The term "3 db quadrature hybrid" refers to that class of power dividing networks in which the power of the incident signal, applied to one branch of one pair of conjugate branches, divides equally between the other pair of conjugate branches and wherein the relative phases of the divided signal components differ by 90 degrees. This includes a large variety of power dividing networks among which are the Riblet coupler (H. J. Riblet, "The Short-Slot Hybrid Junction," Proceedings of the Institute of Radio Engineers, vol. 40, No. 2, February 1952, pp. 180–184), the multihole directional coupler (S. E. Miller, "Coupled Wave Theory and Waveguide Applications," Bell System Technical Journal, vol. 33, May 1954, pp. 661 to 719), the semi-optical directional coupler (E. A. J. Marcatili, "A Circular Electric Hybrid Junction and Some Channel-Dropping Filters," Bell System Technical Journal, vol. 40, January 1961, pp. 185 to 196), and the strip transmission line directional coupler (H. K. Shimizu in an article entitled "Strip-Line 3 db Directional Couplers," published in the 1957 Institute of Radio Engineers Wescon Convention Record, vol. 1, part 1, pp. 4–15).

Each of the networks 45 and 46 is essentially a length of uniform transmission line which is terminated at the far end by means of a reactive termination, and which contains a plurality of adjustable reactive discontinuities along its length. As will be explained in greater detail hereinbelow, the slope of the phase characteristic and the amplitude of the average phase delay introduced by the equalizer are independently controlled by the reactive terminations. The phase ripples introduced by the equalizer are controlled by the reactive discontinuities distributed along the networks. The equalizer is designed so that both networks 45 and 46 are essentially identical and corresponding adjustments in both networks are ganged together so that all adjustments produce substantially the same changes in the two networks, thereby maintaining electrical symmetry.

Referring to FIG. 4, networks 45 and 46 comprise sections of uniform transmission line 5 and 5' having a plurality of phase-ripple adjustments 1, 2 and 3, and 1', 2' and 3', distributed along their respective lengths. In general, each of these adjustments comprises a pair of independently adjustable reactive discontinuities 47–48, 49–50, 51–52, and 47'–48', 49'–50', and 51'–52'. The members of each pair of discontinuities are spaced approximately one-eighth wavelength apart from each other at the midband of the band of frequencies over which phase equalization is to be achieved, and each pair of discontinuities is spaced a distance $l$ from the next adjacent pair. The manner of determining $l$ will be explained in greater detail hereinbelow.

While three pairs of discontinuities are illustrated in each network, it is to be understood that fewer than three, or more than three pairs can be used, as indicated by the dotted section of line between pairs 2 and 3, and 2' and 3'. In particular, as many pairs of discontinuities are used in each network as there are significant Fourier ripple components which are to be compensated.

The reactive terminations 4 and 4' at the ends of networks 45 and 46 comprise a pair of parallel-connected transmission line sections 53, 54 and 53', 54', respectively. Line section 53 in network 45 and line section 53' in network 46 are adjustable open-circuited line sections, whereas line section 54 in network 45 and line section 54' in network 46 are adjustable short-circuited line sections. Line sections 53 and 53', and line sections 54 and 54' are advantageously ganged together so that slope and average phase corrections, which are controlled by the terminating reactances 4 and 4', are substantially the same for the two networks.

Since both networks 45 and 46 are designed to be substantially identical, comments made relative to one are equally relevant to the other. To simplify the following discussion, reference will be made to network 45, it being understood, however, that these comments, unless otherwise stated, are equally applicable to network 46.

The relative phase shift experienced by a signal propagating through the equalizer from input branch 41 to output branch 42 depends upon the electrical length of network 45. To control this phase shift, the electrical length of network 45 is made variable by adjusting the lengths $l_1$ and $l_2$ of the transmission line sections 53 and 54 which make up the reactive termination 4. By writing the expression for the parallel admittance of these two line sections, and computing the coefficient of reflection, it can be shown that for the special case wherein the lengths of the line sections 53 and 54 are equal, $l_1 = l_2 = l_0$, and wherein $y_{01} = y_{02} = y_0/2$, that the angle $\varphi$ of the coefficient of reflection is given by $$\varphi = 8\pi f \frac{l_0}{v} \qquad (1)$$

where $v$ is the velocity of propagation of the signal in line sections 53 and 54;

$y_{01}$ and $y_{02}$ are the characteristic admittances of line sections 53 and 54;

$y_0$ is the characteristic admittance of line 5; and $f$ is the signal frequency.

Figure 5:
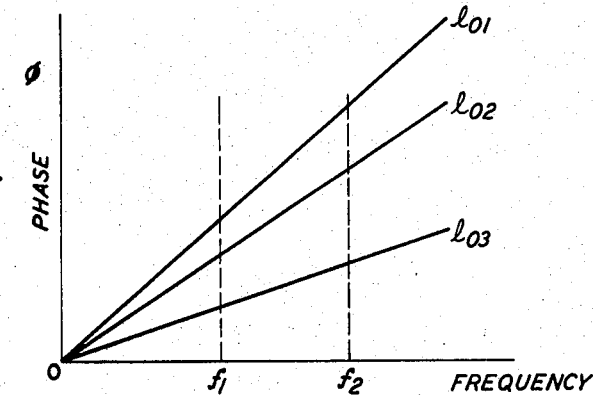
FIG. 5 shows the variations in the average phase delay produced by changing the lengths of the line sections terminating the phase equalizer illustrated in FIG. 4.

FIG. 5 shows the variation in phase shift $\varphi$ as a function of frequency $f$, for different lengths of transmission line sections $l_{01}$, $l_{02}$ and $l_{03}$. Since $\varphi$ varies linearly with frequency and length, the curves pass through the origin, and vary in slope as the lengths are changed. Over the limited frequency range of interest, $f_1$ to $f_2$, however, the primary change is in the average phase shift. Thus, by simultaneously adjusting the lengths of line sections 53 and 54, the average phase shift in the phase equalizer can be controlled.

Figure 6:
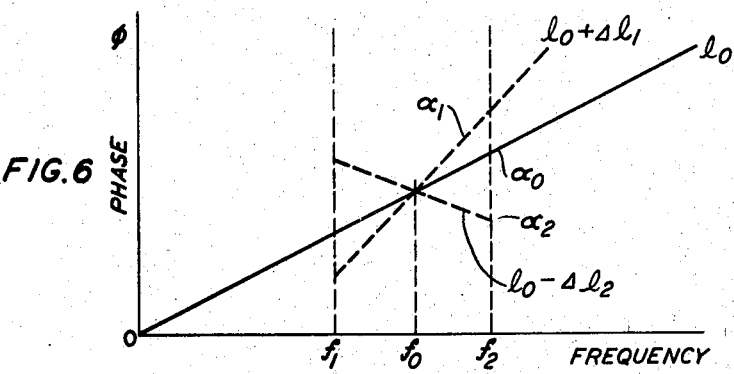
FIG. 6 shows the variations in the slope of the phase characteristics by changing the lengths of the terminating line sections relative to each other.

The slope of the phase characteristic is also controlled by variations in the reactive termination 4 of network 45 by adjusting the relative lengths of line sections 53 and 54. For example, if the length $l_0$ of the open-circuited line section 53 is increased by an amount $\Delta l$, and the length $l_0$ of the short-circuited line 54 is decreased by the same amount $\Delta l$, the frequency-phase curve remains substantially linear, but it is caused to rotate about a point on the phase curve. This is illustrated in FIG. 6, which shows the phase curve for line length $l_0$ and the effect upon the curve produced by making incremental changes $\Delta l_1$, $\Delta l_2$ in the lengths of line sections 53 and 54 relative to $l_0$.

It can be shown that the slope $\alpha$ of the phase curve is given by $$\alpha = 8\pi \frac{l_0}{v} \left[ \frac{1}{1+\frac{3\Delta l}{l_0}} \right] \quad (2)$$

As can be seen from Equation 2, the slope of the phase curve changes with $\Delta l$, and can be either positive or negative, permitting a continuous variation of slope about a reference slope $\alpha_0$ evaluated at $\Delta l = 0$. This is illustrated in FIG. 6 which shows a phase curve with slope $\alpha_0$, evaluated for length $l_0$ ($\Delta l = 0$) at frequency $f_0$; a phase curve with slope $\alpha_1$, greater than $\alpha_0$, evaluated for a change in lengths equal to $\Delta l_1$; and a phase curve with negative slope $-\alpha_2$, evaluated for a change in length $\Delta l_2$ for which $$\left(1 + \frac{3\Delta l_2}{l_0}\right)$$

is negative.

Thus, by adjusting the lengths of the transmission line sections 53 and 54 terminating network 45 (and, simultaneously, the lengths of transmission line sections 53' and 54' terminating network 46), the average phase shift, and the slope of the phase shift characteristic of the phase equalizer can be independently controlled to a first approximation. In practice, advantageously the lengths $l_0$ of the two line sections 53 and 54 are adjusted first, and then small changes $\Delta l$ are made in each, followed by a readjustment in the lengths of both line sections, if required, to produce the desired average phase characteristic and phase-slope characteristic.

Rapid variations in phase, the so-called phase ripples, are controlled by the phase ripple adjustments 1, 2 and 3. These adjustments comprise reactive discontinuities equispaced along network 45 and are intended to create additional reflections and, thereby, to produce ripples in the phase-frequency characteristic.

As noted above, each ripple adjustment comprises two independently adjustable reactive discontinuities spaced approximately one-eighth wavelength apart from each other at the midband frequency of the frequency range of interest.

Typically, each discontinuity comprises an inductive-capacitive network wherein one or more of the component elements of the network are adjustable. At one particular setting, the zero setting, the network is matched to the transmission line 5 and no reflection of wave energy is produced. By adjusting the discontinuity away from its zero setting, a small reflection is introduced. As a result, the signal emerging from the equalizer contains a small signal component whose time delay from input to output is less than that of the main signal component reflected from the reactive termination 4. Consequently, the resulting overall phase delay characteristic contains a ripple component superimposed upon the average phase shift, whose magnitude is determined by the magnitude of the discontinuity and whose periodicity is determined by the distance between the discontinuity and the end termination 4. In particular, a discontinuity located near hybrid junction 40 produces a more rapid phase variation than a discontinuity located nearer to the end termination.

In FIGS. 3A, 3B and 3C, the zero points of the Fourier components are illustrated as corresponding to the upper and lower frequencies of the band of interest. It was noted, however, that this need not necessarily be so. To accommodate Fourier components with any arbitrary phase relationship, the discontinuities are arranged in pairs, spaced an eighth of a wavelength apart. By so spacing the discontinuities, the ripple components from each pair of discontinuities consist of two components with substantially the same periodicity but with a 90 degree relative phase shift. By adjusting the relative amplitude of these two components, a net ripple component of arbitrary phase can be obtained.

Figure 7A:
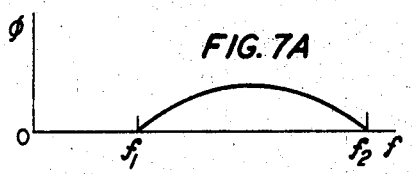
FIGS. 7A, 7B, 7C, 7D, 7E and 7F show the phase ripples introduced by the phase-ripple adjustments in the phase equalizer.
Figure 7B:
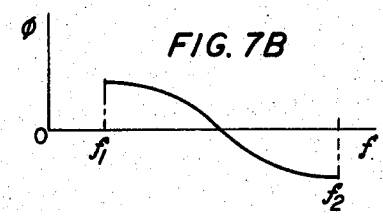
Figure 7C:
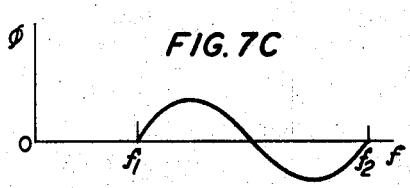
Figure 7D:
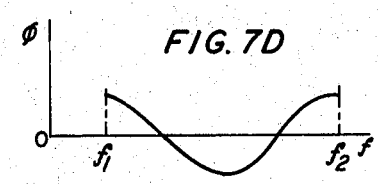
Figure 7E:
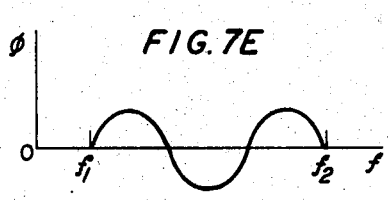
Figure 7F:
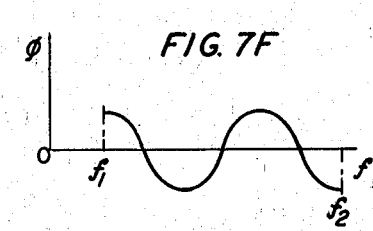

To determine the spacing between adjacent ripple adjustments and between adjustment 3 and the end termination 4, it is noted that adjustment 3 is required to produce a half cycle phase variation over the band of interest. This requires that the distance $l$ from the end of network 45 to adjustment 3 be such that the wave reflected from termination 4 is rotated by 180 degrees with respect to the wave reflected at adjustment 3. This requirement is satisfied when discontinuity 52 of ripple adjustment 3 is located a distance $$l = \frac{v}{4(f_2 - f_1)} \quad (3)$$

from the end of the line. Discontinuity 51, by virtue of its one-eighth wavelength spacing from discontinuity 52 introduces a second ripple component which is 90 degrees out of phase with the ripple produced by discontinuity 52. Together, they produce a ripple component of arbitrary phase. FIGS. 7A and 7B show the ripple components introduced by discontinuities 51 and 52 (and 51' and 52') of equal periodicity $\pi$, but 90 degrees out of time phase.

To obtain additional ripple components of $2\pi$ and $3\pi$ phase variations, the additional ripple adjustments 2 and 1 are distributed along network 45 at intervals equal to $l$. FIGS. 7C, 7D and FIGS. 7E, 7F show the ripple components $2\pi$ and $3\pi$, respectively, introduced by ripple adjustments 1 and 2 (and 1' and 2').

Figure 8:
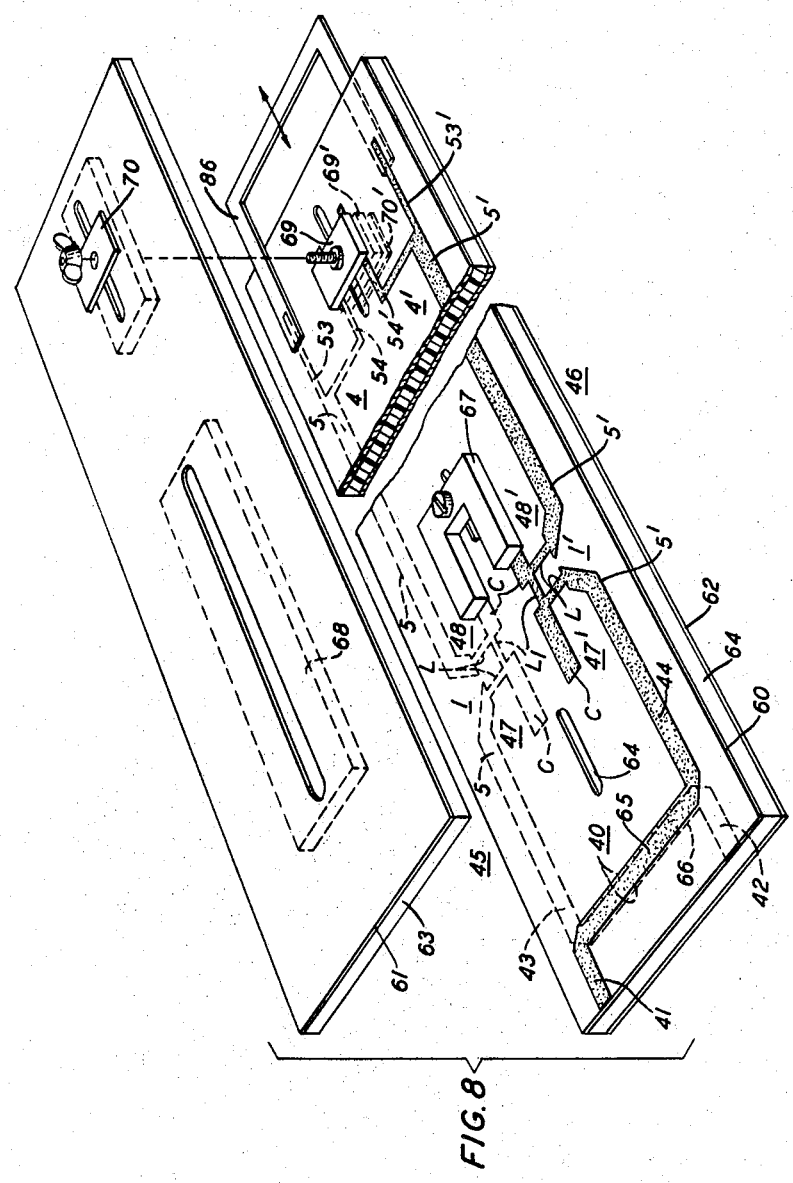
FIG. 8 is a strip transmission line form of the embodiment of the invention illustrated in FIG. 4.

FIG. 8 is a specific illustrative embodiment of the invention utilizing a strip transmission line configuration. It is to be understood, however, that the invention can be practiced using other types of transmission media such as conductively bounded waveguides as is well known to those skilled in the art.

In the illustrative embodiment of FIG. 8, the inner conductor of the circuit is printed, etched, or otherwise bonded to a thin sheet of dielectric material 60, and located between upper and lower ground planes 61 and 62. The ground planes are conductively insulated from the inner conductor by means of dielectric sheets 63 and 64.

In the following discussion corresponding circuit components will be identified with the same identification numerals as were used in FIG. 4 for ease of identification. Thus, in FIG. 8, the 90 degree hybrid junction, which comprises the pair of center conductors 65 and 66 (and is of the type described by J. R. Shimizu in the above-mentioned article), is identified by numeral 40. Hybrid 40 has two pairs of conjugate branches 41 and 42, and 43 and 44, of which branch 41 is the input branch and branch 42 the output branch.

Connected to branches 43 and 44, respectively, are the two networks 45 and 46, each of which comprises a length of line along which there are distributed the ripple adjustments, and each of which is terminated by means of an adjustable reactive termination. Referring more particularly to FIG. 8, the length of transmission line includes the conductors 5 and 5' (and the associated ground planes). The ripple adjustments 1 and 1' comprise the two sets of discontinuities 47, 48 and 47' and 48'. Each of the discontinuities comprises a series inductive section L made up of a length of conductor of reduced width, and an adjustable shunt capacitance C made up of a shunt stub. Adjacent stubs are connected by a second series inductive section $L_1$ of reduced width. By making inductance $L_1$ equal to 2L, the two discontinuities 47 and 48 (and also 47' and 48') are the equivalent of two low pass T filters, each of which has an equivalent electrical length equal to an eighth of a wavelength when the filters are adjusted to match the impedance of the connecting transmission line 5 (and 5'). The required phase shift and impedance match are realized when C and L satisfy the following two conditions:

$$\beta = 2\pi f \sqrt{2LC}$$

and $$z_0 = \sqrt{2LC}$$

where $\beta$ is the required phase shift equal to $\pi/4$ radians;
$f$ is the midband frequency; and
$z_0$ is the characteristic impedance of lines 5 and 5'.

A mismatch at the discontinuities is obtained by changing the magnitude of the shunt capacitance C. In the embodiment of FIG. 8, adjustability is provided by means of a dielectric slider located between the shunt stubs C and one of the ground planes. In the figure, one slider 67 is shown positioned adjacent to the shunt stubs. A second slider (not shown) would also be positioned adjacent to the shunt stubs associated with discontinuities 47 and 47'.

The dielectric sliders are adapted to slide along the stubs C, thereby varying the effective dielectric constant between each stub and the ground plane 61. To accommodate the sliders, a corresponding open region 68 is provided in dielectric spacer 63. Suitable slots and fastening screws or the like, shown in FIG. 8, but not otherwise identified, are also provided to permit adjustments to be made.

Additional ripple adjustments (not shown) are generally provided, as indicated in FIG. 4, corresponding in number to the number of significant ripple components that are to be equalized. These are substantially the same as the ripple adjustments 1 and 1' illustrated in FIG. 8 and are spaced along the transmission lines 5 and 5' at equal intervals.

The end terminations 4 and 4' comprise the two pairs of reduced width line sections 53, 54 and 53' and 54', connected in parallel at the ends of lines 5 and 5', respectively. The reduction in width is made to satisfy the condition that the admittance of these line sections be equal to half the admittance of lines 5 and 5'.

The effective lengths of the open-circuited line sections 53 and 53' are adjusted by means of a conductive slider 68 which is adapted to slide longitudinally along the lengths of line sections 53 and 53'. Slider 68 does not make conductive contact with line sections 53 and 53', but rather is conductive insulated therefrom by means of dielectric sheet 60. The operation of a variable open circuit of this type is explained in greater detail in applicant's copending application Ser. No. 333,343, filed Dec. 26, 1963.

Line sections 54 and 54', on the other hand, are conductively short circuited to the upper and/or the lower ground planes 61 and 62 by means of conductive sliders 69, 69', 70 and 70'.

In operation, a signal whose phase characteristic is to be changed in some prescribed manner over a prescribed range of frequencies is coupled to input branch 41 of hybrid junction 40. The hybrid junction divides the input signal into two signals of substantially equal magnitude, and ninety degrees relative phase shift. These signal components are, in turn, coupled to networks 45 and 46 by way of conjugate branches 43 and 44, respectively.

When all the ripple adjustments are set at their zero position, all the frequency components of the two equal signals propagate to the ends of networks 45 and 46, where they are totally reflected by the reactive end terminations 4 and 4'. The reflected signal components are recombined in hybrid junction 40 and are coupled to a utilization circuit (not shown) by way of output branch 42.

The average phase shift experienced by a signal passing through the equalizer between input branch 41 and output branch 42, and the slope of the frequency-phase characteristic, are functions of the lengths of the line sections 53, 54, 53' and 54' terminating networks 45 and 46.

Figure 9:
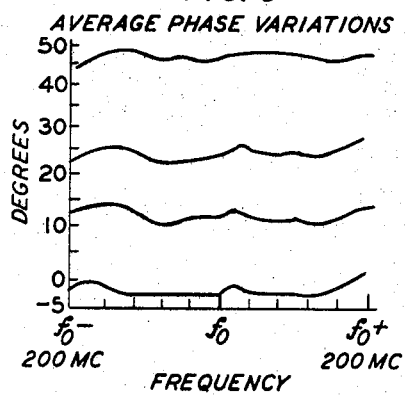
FIGS. 9 through 16 show actual performance characteristics of an L-band phase equalizer in accordance with the present invention.
Figure 10:
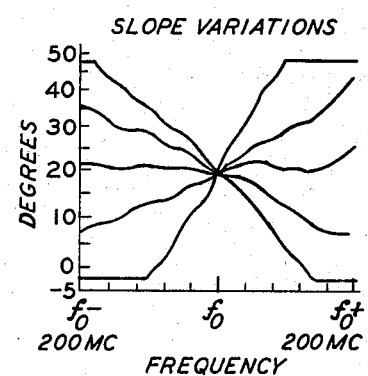

FIGS. 9 and 10 show typical average phase and slope variations for an L-band equalizer operating at a midband frequency of 1,000 megacycles per second. The maximum variations obtained exceeded 60 degrees for the average phase and ±30 degrees per 100 mc. for the slope.

Figure 11:
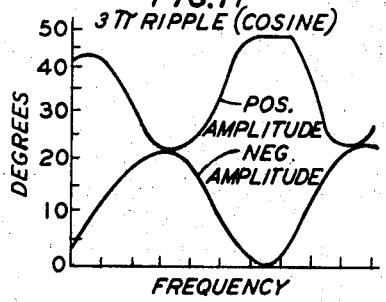
Figure 12:
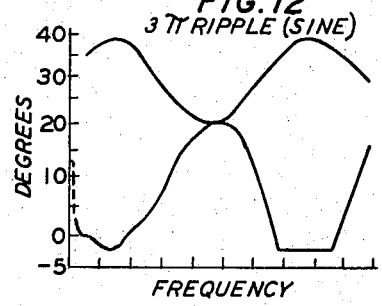

Having adjuated the lengths of line segments 53, 54, 53' and 54' for the desired average phase and phase-slope characteristic, the several ripple adjustments are then made. FIGS. 11 and 12 show the range of $3\pi$ ripples that were obtained with the two $3\pi$ ripple discontinuities in the above-mentioned L-band equalizer. The curves in the two figures are similar but shifted one quarter cycle relative to each other. By combining the wave energy reflected by the two $3\pi$ ripple discontinuities in varying amounts, $3\pi$ ripples of any desired phase can be produced.

Figure 13:
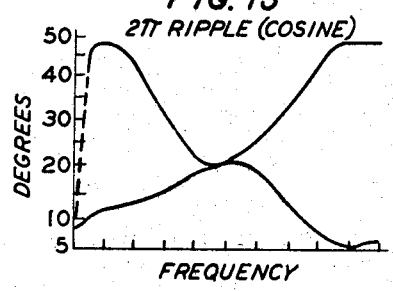
Figure 14:
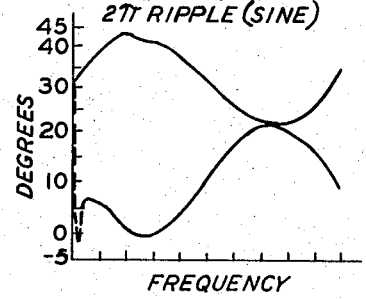
Figure 15:
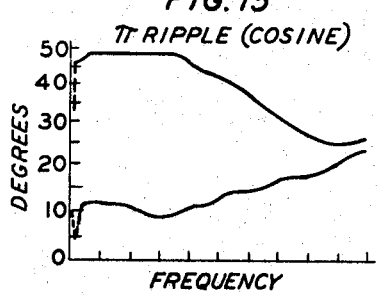
Figure 16:
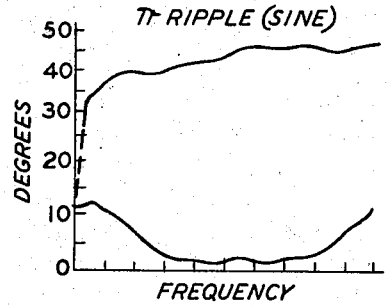

FIGS. 13 and 14 show the $2\pi$ ripples and FIGS. 15 and 16 show the $\pi$ ripples obtained in the equalizer. Some of the curves are somewhat distorted from sinusoidal curves. This is due to multiple interaction between the several ripple adjustments.

Figure 17:
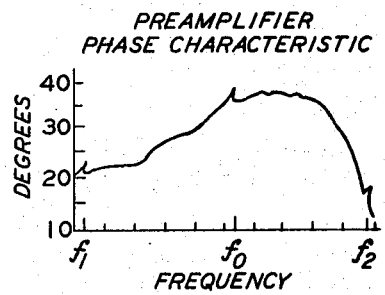
FIG. 17 shows the phase characteristic of a preamplifier.
Figure 18:
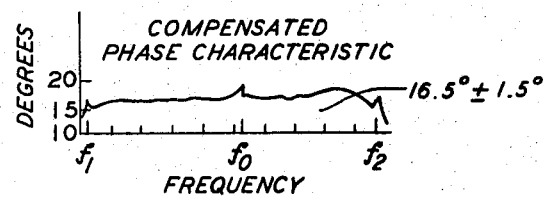
FIG. 18 shows the combined phase characteristic of the preamplifier and phase equalizer.

FIGS. 17 and 18 show the results obtained using the phase equalizer to compensate the phase characteristic of a preamplifier. FIG. 17 is the phase characteristic of the preamplifier alone, which is seen to have a phase nonlinearity of ±11 degrees over the frequency band of interest. FIG. 18, which shows the combined phase characteristic of the preamplifier and phase equalizer, can be seen to be flat within ±1.5 degrees over the same frequency range.

Figure 19:
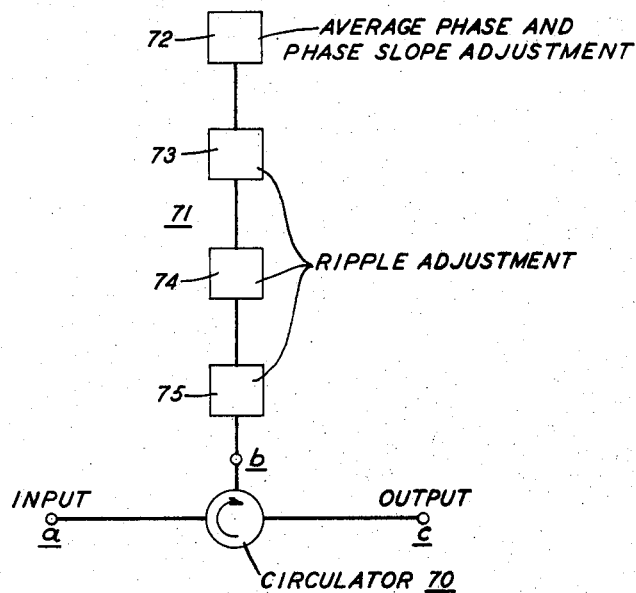
FIG. 19 shows an alternative embodiment of the invention using a circulator and one reactive network.

FIG. 19 is a block diagram of a second illustrative embodiment of the present invention employing a circulator 70 and a single reactive network 71. In a conductively bound waveguide configuration, circulator 70 can be of the type described in United States Patent 2,849,687, or that described in United States Patent 3,015,787. In a strip transmission line configuration, the circulator can be of the types described in United States Patents 3,063,-024 and 3,174,116. The reactive network 71 is substantially identical to either of the reactive networks 45 or 46 described above and includes an adjustable termination 72 for controlling the average phase and phase slope, and a plurality of ripple adjustments 73, 74 and 75 distributed along network 71.

In operation, a signal whose phase-frequency characteristic is to be modified in some prescribed manner is introduced into circulator 70 by way of input port $a$, and is coupled through the circulator to port $b$ and network 71. The action of network 71 and the adjustments required to produce the desired phase equalization are performed in the manner described hereinafter.

The reflected signal reenters the circulator through port $b$ and is coupled therefrom to the output port $c$.

While the illustrative embodiment of the invention shown in FIG. 8 uses balanced strip transmission line, it is understood that the invention is not limited to any particular type of transmission line and that both embodiments of the invention can be constructed using other forms of transmission media, as would be obvious to those skilled in the art. In addition, the invention is not limited to the particular type of reactive discontinuities shown. Thus, in all cases it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. A phase equalizer comprising in combination:
a quadrature hybrid junction having two pairs of conjugate branches;
one branch of one pair of conjugate branches being an input branch;
the other branch of said one pair of conjugate branches being an output branch;
substantially identical reactive networks connected to the branches of the other pair of conjugate branches;
each of said networks comprising:
a length of delay line;
an adjustable reactive termination at the end of said line;
and a plurality of adjustable reactive discontinuities distributed along said line.

2. The equalizer according to claim 1 wherein each of said delay lines is a length of transmission line.

3. The equalizer according to claim 1 wherein said reactive termination comprises an adjustable length of open-circuited transmission line and an adjustable length of short-circuited transmission line connected in parallel to the end of said delay line.

4. The equalizer according to claim 1 wherein the reactive discontinuities are arranged in pairs and wherein the continuities comprising each pair are spaced one-eighth of a wavelength apart at the midfrequency of the frequency band of interest.

5. The equalizer according to claim 4 wherein adjacent pairs of discontinuities are spaced apart a distance $v/4(f_2-f_1)$ where $v$ is the velocity of propagation of wave energy along said networks and $f_2$ and $f_1$ are the upper and low frequencies, respectively, of the frequency band of interest.

6. A phase equalizer comprising in combination:
a quadrature hybrid junction having two pairs of conjugate branches;
one branch of one pair of conjugate branches being an input branch;
the other branch of said one pair of conjugate branches being an output branch;
two substantially identical reactive networks connected to the two branches, respectively, of the other pair of conjugate branches;
each of said networks being terminated by parallel-connected open-circuited and short-circuited sections of transmission line;
and each of said networks including a plurality of equally spaced pairs of adjustable reactive discontinuities distributed therealong.

7. A phase equalizer comprising:
a circulator having at least three ports;
one of said ports being an input port;
another of said ports being an output port;
a reactive network connected to the port intermediate between the input and output ports;
said network comprising:
a length of uniform transmission line;
an adjustable reactive termination at the end of said line;
and a plurality of adjustable reactive discontinuities distributed along said line.

References Cited
UNITED STATES PATENTS

| | | | |
|---|---|---|---|
| 2,896,176 | 7/1959 | Bellows | 333—28 |
| 3,196,371 | 7/1965 | Marie | 333—28 |
| 2,639,326 | 5/1953 | Ring | 333—28 |
| 2,633,492 | 3/1953 | Ring | 333—11 |
| 3,258,721 | 6/1966 | La Russa et al. | 333—9 |

HERMAN KARL SAALBACH, *Primary Examiner.*

C. BARAFF, *Assistant Examiner.*

U.S. Cl. X.R.

333—10, 28